(12) United States Patent
Inoue

(10) Patent No.: US 6,232,729 B1
(45) Date of Patent: May 15, 2001

(54) MOTOR CONTROL DEVICE FOR AN ELECTRIC VEHICLE CAPABLE OF PREVENTING A BATTERY OF THE VEHICLE FROM BEING OVERCHARGED

(75) Inventor: Masahiro Inoue, Himeji (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/408,154

(22) Filed: Mar. 21, 1995

(30) Foreign Application Priority Data

Mar. 24, 1994 (JP) .................................................... 6-053853

(51) Int. Cl.$^7$ ....................................................... H02P 3/00
(52) U.S. Cl. ................................................................. 318/139
(58) Field of Search ............................ 318/139, 362–364, 318/369, 375–382; 363/40, 41, 37, 50, 52, 55; 180/170–179

(56) References Cited

U.S. PATENT DOCUMENTS

| 3,657,625 | * | 4/1972 | Miller et al. ...................... 318/376 X |
| 3,735,220 | * | 5/1973 | Renner et al. ........................ 318/139 |
| 4,554,999 | * | 11/1985 | Kamaike ............................ 318/376 X |
| 4,787,021 | * | 11/1988 | Hokari et al. ........................... 363/37 |
| 5,359,308 | * | 10/1994 | Sun et al. .......................... 318/139 X |

* cited by examiner

Primary Examiner—Jonathan Wysocki
(74) Attorney, Agent, or Firm—Sughrue, Mion, Zinn, Macpeak & Seas, PLLC

(57) ABSTRACT

A motor control device for an electric vehicle is capable of protecting component units from damage and also protecting a storage battery from deterioration or breakage by preventing an excessive increase in a regenerative braking amount of a motor. An auxiliary controller controls the regenerative braking amount of the motor so that the voltage of the storage battery, which is detected by a voltage detector, stays at a predetermined voltage value or less at the time of regenerative braking of the motor.

21 Claims, 8 Drawing Sheets

MOTOR CONTROL DEVICE FOR AN ELECTRIC VEHICLE CAPABLE OF PREVENTING A BATTERY OF THE VEHICLE FROM BEING OVERCHARGED

BACKGROUND OF THE INVENTION

1. Field of the Invention

The present invention relates to a control device for a motor employed for an electric vehicle and, more particularly, to a motor control device which is designed to prevent the deterioration of a storage battery or the like by preventing an excessive increase in the regenerative braking amount of the motor.

2. Description of the Related Art

FIG. 6 is a block diagram showing a motor control device for an electric vehicle. The motor control device for the electric vehicle is equipped with a motor 1, which is operatively connected to driving wheels (not shown), and a driver circuit 2 which is connected to the motor 1 to drive the motor 1. The motor control device is further provided with a controller 3 for controlling the motor via the driver circuit 2, a storage battery 4 for supplying power to the motor 1, the driver circuit 2 and the controller 3, a brake stroke sensor 5 which is provided on an operating section of each brake (not shown) for detecting an the operating amount of the corresponding brake and supplying the detected operating amount of the brake to the controller 3, and a revolution detector 6 which is provided on the motor 1 for detecting the number of revolutions (i.e., rpm) of the motor 1 and supplying the detected number of revolutions to the controller 3.

FIG. 7 shows the relationship between regenerative power and a maximum regenerative torque with respect to the number of revolutions per minute of the motor 1. As it is obvious from the chart, the relationship between the regenerative power and the maximum regenerative torque satisfies the expression given below:

Regenerative power Max. regenerative torque×Number of revolutions (rpm)

Decelerating a vehicle at a fixed deceleration value gives good deceleration feeling without causing a shock to a driver and/or passenger. To achieve this, it is necessary to regenerate the motor of the electric vehicle at a fixed torque, so the regenerative power is apropriately set as shown in a diagram of FIG. 8. According to FIG. 8, the regenerative torque becomes constant when a set rpm N0 or more is reached. Further, in an actual vehicle, regenerating the motor so far as the rpm becomes zero causes a shock or the like immediately before reverse rotation or stoppage of the motor 1. For this reason, there are some cases where the regenerative torque is reduced to zero at a certain rpm, as shown in FIG. 9.

As stated above, FIG. 8 and FIG. 9 show an example of the regenerative torque corresponding to the rpm of the motor 1. FIG. 10 shows the regenerative torque (brake regenerative torque) of the motor 1 with respect to the output value of the brake stroke sensor 5. FIG. 11 shows the relationship between the regenerative torque generated by a wheel brake and the rpm. The regenerative power shown in FIG. 8 and FIG. 9 corresponds to the engine brake of a gasoline-powered automobile and the regenerative power is so set that it is applied when an accelerator pedal, which is not shown, is fully released. The regenerative braking amount, which is the regenerative torque of the vehicle, is designed to be equal to the sum of the regenerative torque generated by the aforesaid wheel brake and the regenerative torque corresponding to the engine brake.

Hence, as the brake operating amount or the rpm of the motor 1 increases, the regenerative braking amount accordingly increases, causing the rechargeable storage battery 4 to be charged with an excessively large magnitude of current. At this time, the voltage of the storage battery 4 increases with the charging current and such an increase is significant when the storage battery is fully charged, as illustrated in FIG. 12.

The above-mentioned motor control device for an electric vehicle is incapable of suppressing the regenerative braking amount of the motor, presenting the following problems. As described above, in certain cases, the regenerative braking amount considerably increases and if the voltage of the storage battery 4 increases to exceed a maximum permissible voltage level, then the controller 3, the driver circuit 2 and other component units will be damaged. Likewise, if the storage battery charging current increases to exceed a maximum permissible current level, then the storage battery 4 may be deteriorated or broken.

SUMMARY OF THE INVENTION

Accordingly, it is an object of the present invention to provide a motor control device for an electric vehicle which is capable of preventing a considerable increase in the regenerative braking amount, thereby protecting various component units from damage and also preventing the storage battery from being deteriorated or broken.

To this end, according to one aspect of the present invention, there is provided a motor control device for an electric vehicle which has a motor powered by a rechargeable battery, the motor control device comprising: voltage detecting means for detecting a voltage of the rechargeable battery; and regenerative braking amount control means for suppressing a regenerative braking amount of the motor by controlling the motor in such a manner that a voltage of the battery detected by the voltage detecting means stays at a predetermined voltage value or less at the time of regenerative braking of the motor.

With this arrangement, the regenerative braking amount control means serves to protect component units associated with the motor from damage which would otherwise be caused if a high voltage greater than the permissible maximum voltage is applied to the component units.

In accordance with another aspect of the invention, there is provided a motor control device for an electric vehicle which has a motor powered by a rechargeable battery, the motor control device comprising: current detecting means for detecting a charging current for the rechargeable battery; and regenerative braking amount control means for suppressing a regenerative braking amount of the motor by controlling the motor in such a manner that a charging current for the battery detected by the current detecting means stays at a predetermined current value or less at the time of regenerative braking of the motor.

With this arrangement, the regenerative braking amount control means serves to protect the battery from deterioration or breakage which would otherwise be caused if a large charging current greater than the permissible maximum current is supplied to the battery.

In a preferred from of the invention, the regenerative braking amount control means gradually decreases the regenerative braking amount at fixed intervals to control the regenerative braking amount. This serves to prevent a sudden decrease in the braking force of the vehicle.

In another preferred form of the invention, the regenerative braking amount control means decreases the regenerative braking amount in accordance with a deviation of an actual voltage of the battery from the predetermined voltage value. This serves to suppress the voltage of the battery so as not to exceed the predetermined voltage value in a reliable manner.

In a further preferred form of the invention, the regenerative braking amount control means decreases the regenerative braking amount in accordance with a deviation of an actual current of the battery from the predetermined current value. This serves to suppress the current of the battery so as not to exceed the predetermined current value.

Preferably, there may be provided means for notifying a driver of the vehicle of an operating condition of the motor.

Preferably, the motor is frequency-, voltage-, current-, or power-controlled.

DESCRIPTION OF THE PREFERRED EMBODIMENTS

Preferred embodiments of the present invention will now be described in conjunction with the accompanying drawings.

First Embodiment

Figure 1:
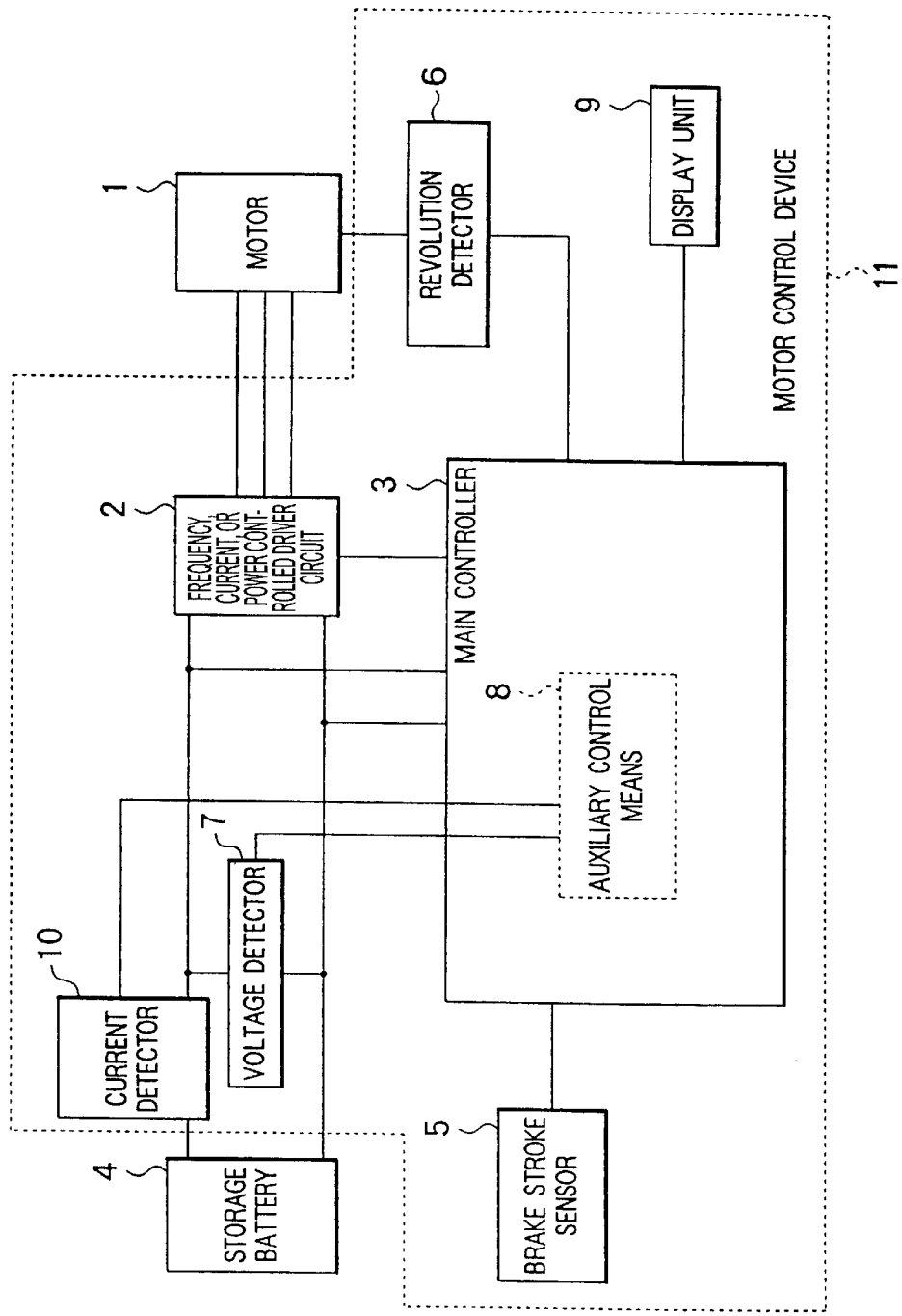
FIG. 1 is a block diagram illustrative of a first embodiment of the present invention.

FIG. 1 is a block diagram showing a first embodiment of the present invention. A motor control device 11 for an electric vehicle according to this embodiment is shown in FIG. 1 and comprises a driver circuit 2, a main controller 3, a brake stroke sensor 5, a revolution detector 6, a voltage detector 7, an auxiliary controller 8, a display unit 9, and a current detector 10. An electric motor 1 is operatively coupled to drive wheels (not shown) of the electric vehicle for driving thereof. The driver circuit 2 is connected to the motor 1 to drive it to rotate in a forward or reverse direction or to stop. The main controller 3 controls the drive of the motor 1 through the driver circuit 2. The auxiliary controller 8 is incorporated in the main controller 3 to control the regenerative braking amount of the motor 1, as will be discussed in detail later. A rechargeable storage battery 4 is connected to the motor 1, the driver circuit 2, the main controller 3 and the like so as to supply power thereto. The brake stroke sensor 5 is provided on an operating section of a brake (e.g., a brake pedal not shown) to detect an operating amount of the brake and supply the detected operating amount to the main controller 3. The revolution detector 6 is provided on the motor 1 to detect the number of revolutions per minute (i.e., rpm) of the motor 1 and supply the detected number of revolutions to the main controller 3. In such an arrangement stated above, the auxiliary controller 8 constitutes a regenerative braking amount control means of the present invention.

The current detector 10 is connected to the storage battery 4 for detecting a charging current flowing into the storage battery 4 and sending the detected charging current value to the auxiliary controller 8 of the main controller 3. The voltage detector 7 is also connected to the storage battery 4 for detecting the voltage of the storage battery 4 and sending the detected voltage value to the auxiliary controller 8. Connected to the main controller 3 is the display unit 9 for displaying an operating condition of the motor 1.

Figure 12:
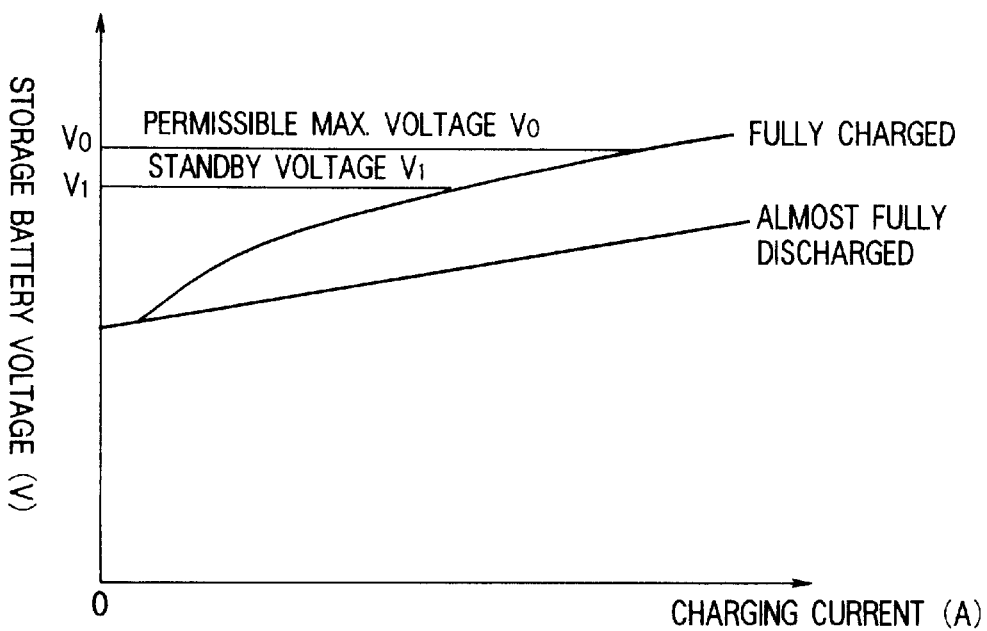
FIG. 12 is a diagram illustrative of the relationship between storage the battery voltage and the charging current.

With the storage battery 4 fully charged, if the motor 1 performs relatively heavy regenerative braking, then the voltage of the storage battery 4 increases as shown in FIG. 12. At this time, if the voltage of the storage battery 4 rises above a predetermined voltage value, namely, a maximum permissible voltage V0 or a standby voltage Vi which is set slightly lower than the maximum permissible voltage V0, then the auxiliary controller 8 of the main controller 3 monitors the voltage of the storage battery 4 and suppresses the regenerative braking amount of the motor 1 according to a flowchart to be discussed later, thereby preventing the voltage of the storage battery 4 from reaching the maximum permissible voltage V0 or more.

The standby voltage V1 is determined in accordance with the maximum permissible voltage. For instance, in a case where the storage battery 4 comprises twenty lead batteries connected in series to each other, the maximum permissible voltage will be approximately 330 V (16.5 V per battery). In this case, the standby voltage V1 is set at a value [e.g., a few tens of volts (10 to 30 V)] lower than the maximum permissible voltage. That value is adjusted in accordance with the vehicle on which the motor control device 11 is mounted.

Figure 2:
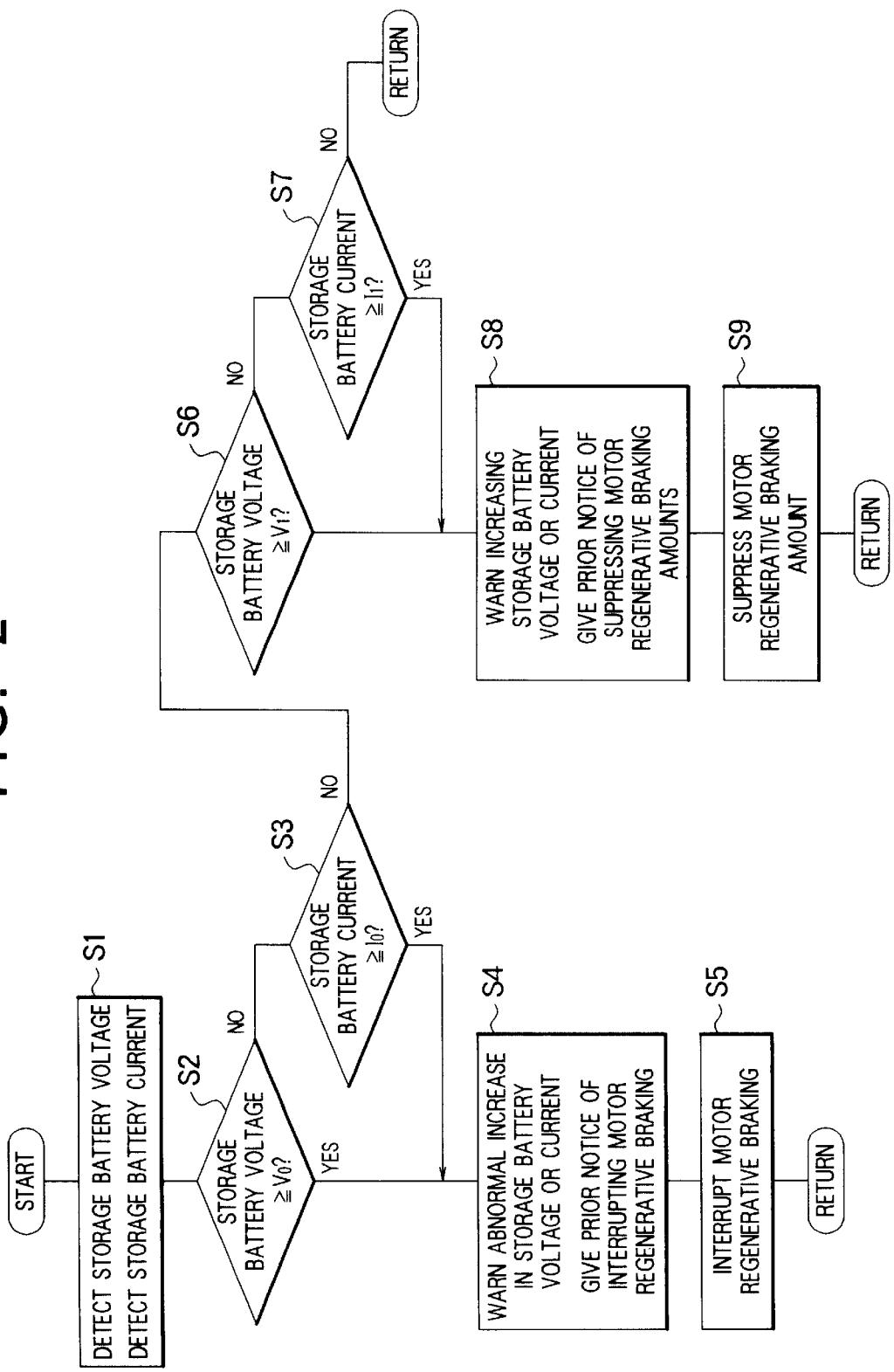
FIG. 2 is a flowchart illustrative of the operation of the first embodiment.

Likewise, if the current of the storage battery 4 increases above a predetermined current value, namely, a maximum permissible current I0 or a standby current I1 which is set slightly lower than the maximum permissible current I0, then the auxiliary controller 8 of the main controller 3 monitors the current of the storage battery 4 and suppresses the regenerative braking amount of the motor 1 according to a flowchart of FIG. 2 to be discussed later, thereby preventing the current of the storage battery 4 from reaching the maximum permissible current I0 or more.

The aforesaid operation of this embodiment will be described below in detail while referring to the flowchart shown in FIG. 2. First, in step S1, the auxiliary controller 8 of the main controller 3 detects the voltage and current of the storage battery 4 at predetermined time intervals through the voltage detector 7 and the current detector 10 while the electric vehicle is travelling. If the detected voltage is found to be equal to or greater than the maximum permissible voltage V0 in step S2 or if it is found in step S3 that the current is equal to or greater than the maximum permissible current I0 although the voltage is lower than the maximum permissible voltage V0, then the program proceeds to step S4. In step S4, the auxiliary controller 8 notifies the driver of an abnormal voltage or abnormal current by giving a visual warning at the display unit 9 and gives a prior notice of stopping the regenerative braking of the motor 1. Thereafter, the auxiliary controller.8 disengages a clutch in a power transmitting system, which transmits the output torque of the motor 1 to wheels of the vehicle, so as to let the motor 1 run freely, thereby interrupting the regenerative braking. At the instant when the regenerative braking is interrupted, the supply of the charging current to the storage battery 4 is stopped. This causes the voltage of the storage battery 4 to drop below the maximum permissible voltage V0 and the current of the storage battery 4 to decrease below the maximum permissible current I0.

If the voltage and current of the storage battery 4 is found to be lower than the maximum permissible voltage V0 and also lower than the maximum permissible current 10 at the same time in steps S2 and S3, and if the voltage of the storage battery 4 reaches or exceeds the standby voltage V1 in step S6, or if the voltage is lower than the standby voltage V1 but the current of the storage battery 4 is found to be equal to or greater than the standby current I1 in step S7, then the program proceeds to step S8 wherein a prior notice, given by the display unit 9, of suppressing the regenerative braking amount of the motor 1 due to an abnormal voltage or abnormal current of the storage battery 4, then suppresses the regenerative braking amount of the motor 1.

Figure 3:
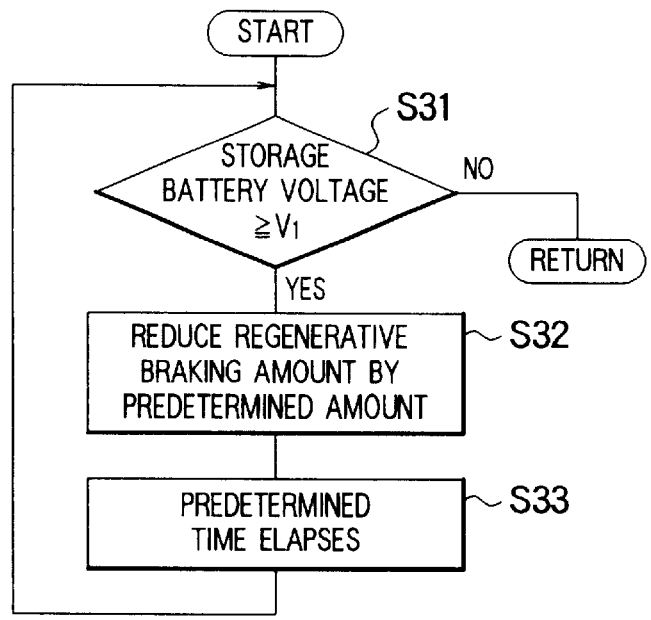
FIG. 3 is a flowchart illustrative of the operation for suppressing the regenerative braking amount of the first embodiment.

Carrying out heavy suppression of the regenerative braking amount at a time would cause a shock to the vehicle. To avoid such a problem, when the voltage of the storage battery 4 is higher than the standby voltage V1, the regenerative braking amount is suppressed by deducting a predetermined amount, which does not cause a shock to the vehicle, from the regenerative braking amount of the motor 1 at predetermined time intervals in accordance with the flowchart shown in FIG. 3. More specifically, the program determines in step S31 whether the storage battery voltage is equal to or larger than the standby voltage V1, and if it is equal to or larger than the standby voltage V1, then the program proceeds to step S32 wherein it decreases the regenerative braking amount by a predetermined amount. When a predetermined time has elapsed in step S33, the program goes back to step S31.

The motor 1 in the form of an induction motor, is normally controlled by controlling the output current and frequency of an inverter through a PWM signal so that a desired regenerative torque can be produced. Hence, in this embodiment, the regenerative braking amount is decreased by decreasing the output current and frequency of the inverter. In carrying out the control, the aforesaid predetermined time will be approximately 4 msec. and the aforesaid predetermined amount will be 0.05 kgf·m in the case of an electric vehicle which uses, for example, a motor having a maximum torque of about 18 Kgf·m (a maximum output of 40 KW).

Second Embodiment

Figure 4:
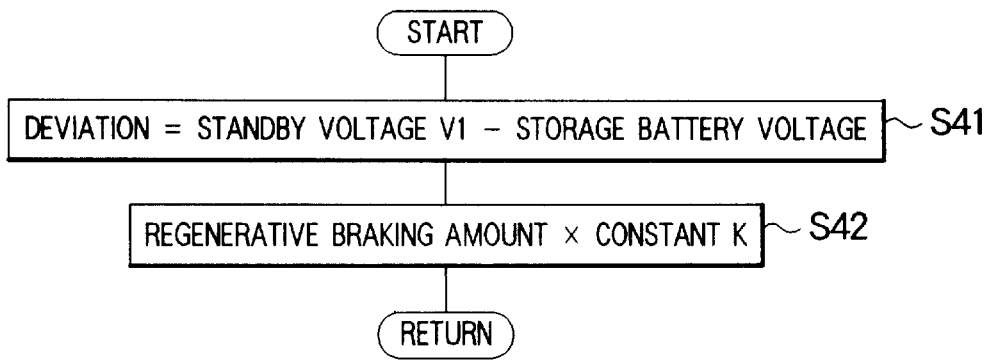
FIG. 4 is a flowchart illustrative of the operation for suppressing the regenerative braking amount of a second embodiment.
Figure 5:
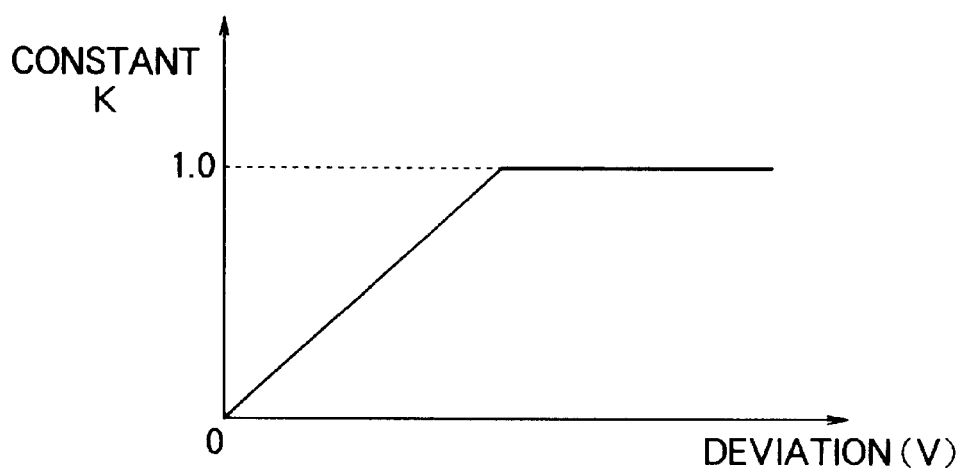
FIG. 5 is a diagram showing the relationship between a constant K and the deviation of the second embodiment.
Figure 6:
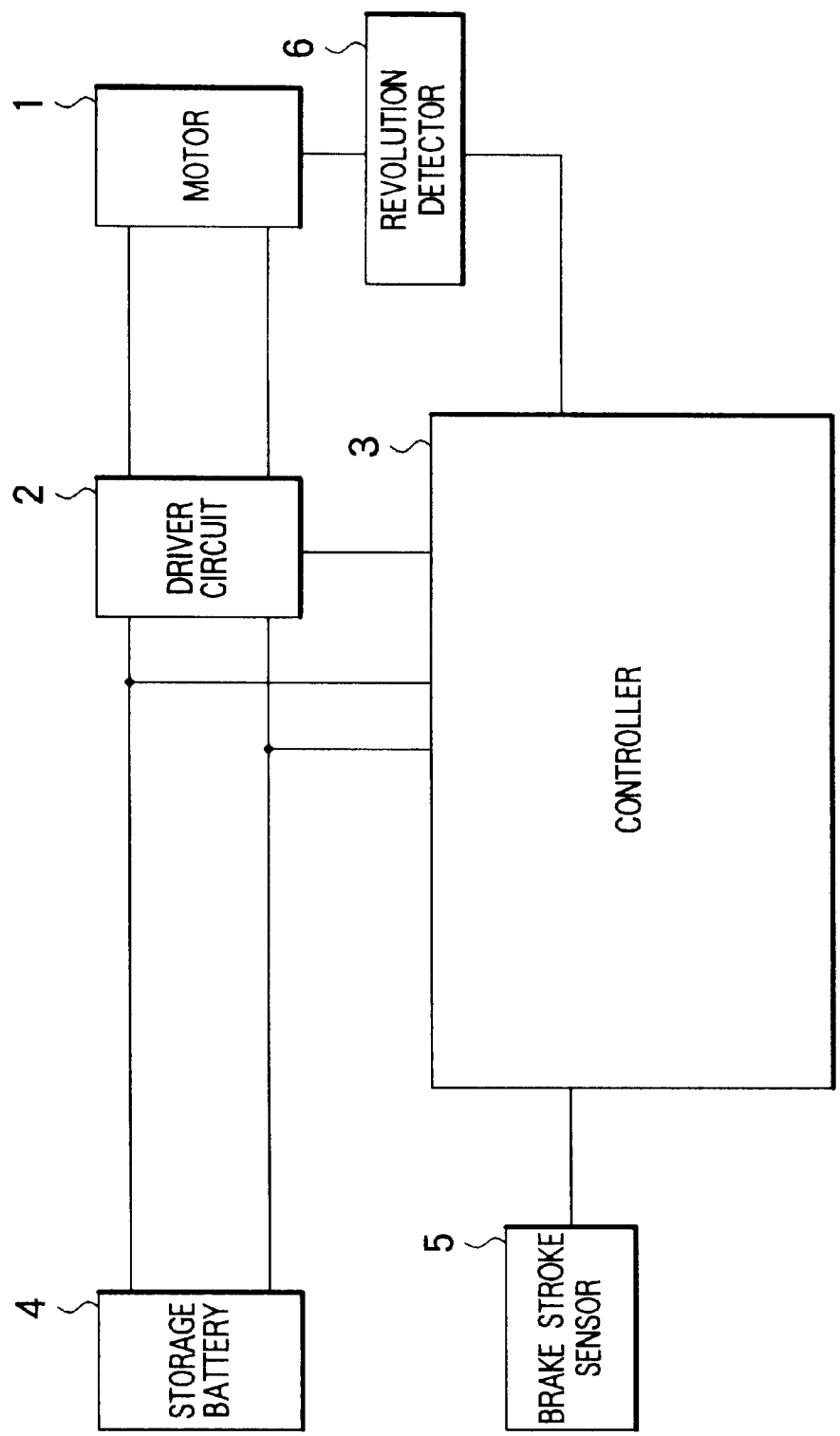
FIG. 6 is a block diagram illustrative of a conventional motor control device for an electric vehicle.
Figure 7:
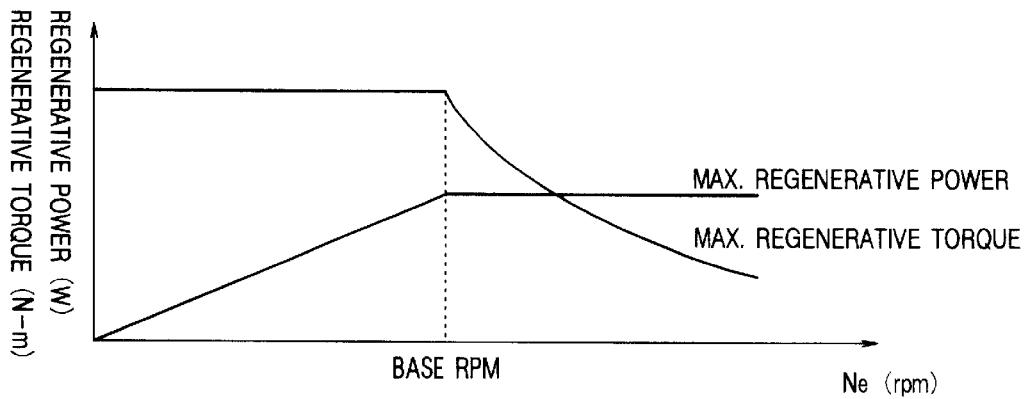
FIG. 7 is a diagram illustrative of the relationship between the rpm of the motor, maximum regenerative torque, and regenerative power.
Figure 8:
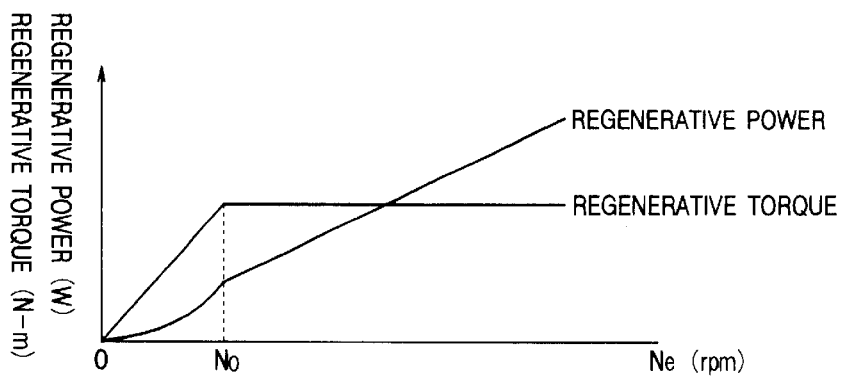
FIG. 8 is a diagram illustrative of a set regenerative power in a vehicle.
Figure 9:
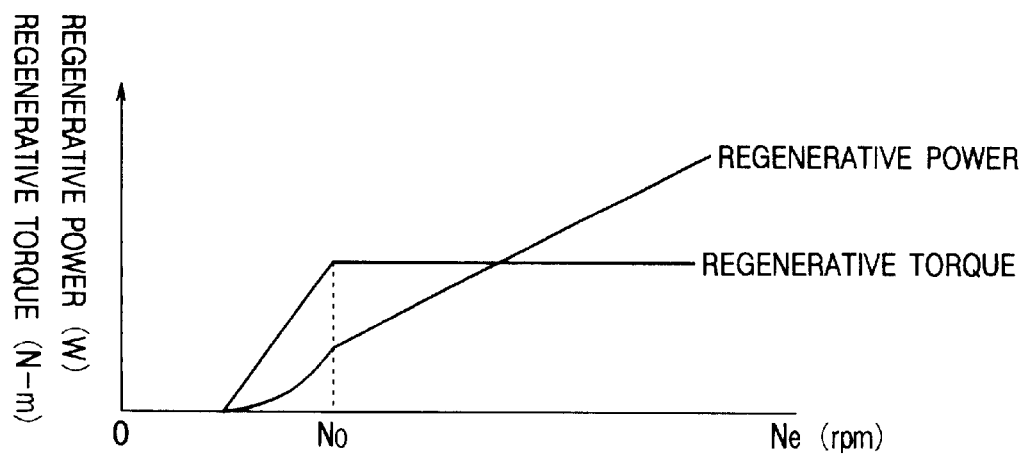
FIG. 9 is a diagram illustrative of a differently set regenerative power in a vehicle.
Figure 10:
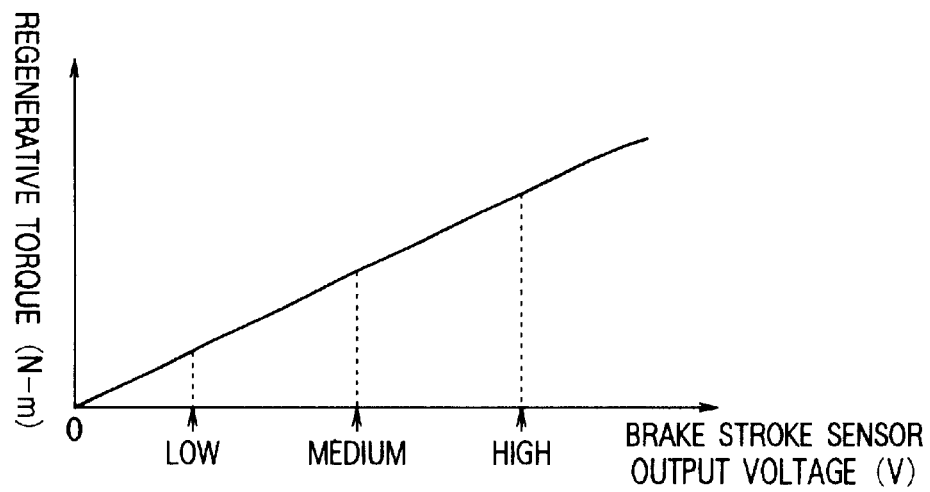
FIG. 10 is a diagram illustrative of the relationship between the regenerative torque and the brake stroke sensor output.
Figure 11:
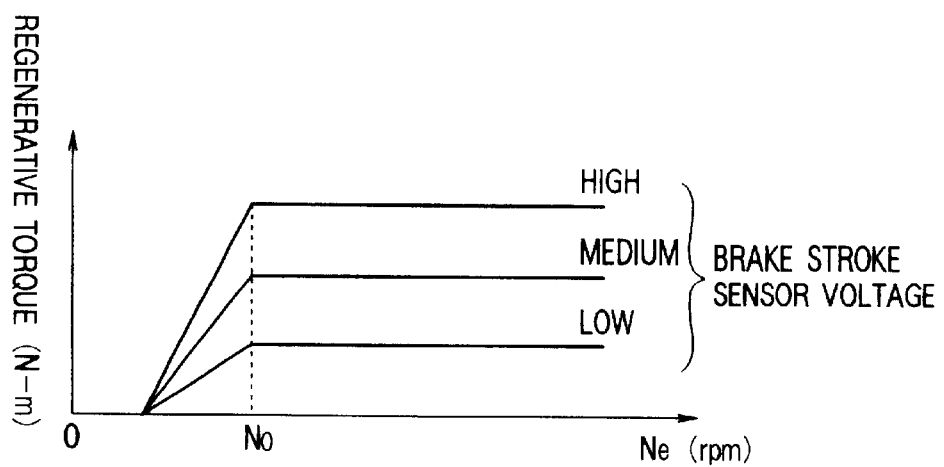
FIG. 11 is a diagram illustrative of the relationship between the regenerative torque, motor rpm, and brake stroke sensor output.

In the first embodiment, the regenerative braking amount is suppressed by subtracting the predetermined amount, which does not cause a shock to the vehicle, from the regenerative braking amount of the motor 1 at predetermined timing. In the second embodiment, the voltage of the storage battery 4 is subtracted from the standby voltage V1, as shown in FIG. 4, to obtain a deviation and multiplying the regenerative braking amount by a constant K corresponding to the deviation given in FIG. 5. More specifically, in FIG. 4, the deviation is obtained by deducting the storage battery voltage from the standby voltage V1 in step S41, then a value of the constant K corresponding to the deviation is obtained from the diagram of FIG. 5 in step S42, and the regenerative braking amount is multiplied by the thus obtained constant K to suppress the regenerative braking amount.

As described above, the suppression of the regenerative braking amount of the motor 1 causes the regenerative current supplied from the motor 1 to decrease and the charging current of the storage battery 4 to decrease accordingly, thus controlling the voltage of the storage battery 4 so as not to exceed the standby voltage V1. The above description refers to the voltage, however, the same applies to the current; the charging current can be deducted from the standby current I1 to obtain the deviation and the regenerative braking amount is multiplied by the constant corresponding to the deviation to implement the suppression.

Thus, the voltage and current of the storage battery 4 is controlled at a lower level than the maximum permissible voltage V0 and the maximum permissible current I0 of the system including the main controller 3, the driver circuit 2, the storage battery 4 and the like, thereby making it possible to protect these system components from deterioration or breakage.

The display unit 9 is capable of furnishing a driver of the vehicle with a visual indication telling him that the regenerative braking amount of the motor 1 is currently being suppressed, or that the motor 1 is at a halt due to a rise in the voltage or current of the storage battery, or that the voltage or current of the storage battery is currently abnormal, in addition to giving a visual prior notice of the interruption of the regenerative braking of the motor 1 or of the planned suppression of the regenerative braking amount.

The motor 1 can be controlled in various manners. For example, the motor 1 may be frequency-controlled, voltage-controlled, current-controlled, or power-controlled. Accordingly, depending on the type of motor 1 used in the particular vehicle, the driver circuit 2 may control the speed and direction of the motor 1 by changing the frequency, voltage, current, and/or power of a control signal output to the motor 1.

What is claimed is:

1. A motor control device for an electric vehicle which has a motor powered by a rechargeable battery, said motor control device comprising:

voltage detecting means for detecting a battery voltage of said rechargeable battery; and regenerative braking amount control means for suppressing an amount of regenerative braking energy supplied from said motor to said rechargeable battery by controlling said motor such that said battery voltage remains less than or equal to a predetermined voltage value, wherein said regenerative braking amount control means suppresses said amount of regenerative braking energy when said battery voltage exceeds a first predetermined voltage.

2. A motor control device for an electric vehicle which has a motor powered by a rechargeable battery, said motor control device comprising:

current detecting means for detecting a charging current for said rechargeable battery; and regenerative braking amount control means for suppressing an amount of regenerative braking energy supplied from said motor to said rechargeable battery by controlling said motor such that said charging current remains less than or equal to a predetermined current value, wherein said regenerative braking amount control means suppresses said amount of regenerative braking energy when said charging current exceeds a first predetermined current.

3. A motor control device for an electric vehicle according to claim 1, wherein said regenerative braking amount control means gradually decreases said amount of regenerative braking energy at fixed time intervals.

4. A motor control device for an electric vehicle according to claim 2, wherein said regenerative braking amount control means gradually decreases said amount of regenerative braking energy at fixed time intervals.

5. A motor control device for an electric vehicle according to claim 1, wherein said regenerative braking amount control means decreases said amount of regenerative braking energy in accordance with a deviation of an actual voltage of said battery from said predetermined voltage value.

6. A motor control device for an electric vehicle according to claim 2, wherein said regenerative braking amount control means decreases said amount of regenerative braking energy in accordance with a deviation of an actual current of said battery from said predetermined current value.

7. A motor control device for an electric vehicle according to claim 1, further comprising means for notifying a driver of the vehicle of an operating condition of said motor.

8. A motor control device for an electric vehicle according to claim 1, wherein said motor is frequency-controlled.

9. A motor control device for an electric vehicle according to claim 1, wherein said motor is voltage-controlled.

10. A motor control device for an electric vehicle according to claim 1, wherein said motor is current-controlled.

11. A motor control device for an electric vehicle according to claim 1, wherein said motor is power-controlled.

12. A motor control device for an electric vehicle according to claim 1, wherein said motor control device further comprises:

current detecting means for detecting a charging current for said rechargeable battery, wherein said regenerative braking amount control means suppresses said amount of regenerative braking energy supplied from said motor to said rechargeable battery by controlling said motor such that said charging current remains less than or equal to a predetermined current value, and wherein said regenerative braking amount control means suppresses said amount of regenerative braking energy when said braking voltage exceeds said first predetermined voltage or said charging current exceeds a first predetermined current.

13. A motor control device for an electric vehicle according to claim 1, wherein said regenerative braking amount control means interrupts said amount of regenerative braking energy supplied from said motor to said rechargeable battery when said battery voltage exceeds a second predetermined voltage and wherein said second predetermined voltage is greater than said first predetermined voltage.

14. A motor control device for an electric vehicle according to claim 2, wherein said regenerative braking amount control means interrupts said amount of regenerative braking energy supplied from said motor to said rechargeable battery when said charging current exceeds a second predetermined current and wherein said second predetermined current is greater than said first predetermined current.

15. A motor control device for an electric vehicle according to claim 12, wherein said regenerative braking amount control means interrupts said amount of regenerative braking energy supplied from said motor to said rechargeable battery when said charging current exceeds a second predetermined current or when said battery voltage exceed a second predetermined voltage, and wherein said second predetermined current is greater than said first predetermined current and said second predetermined voltage is greater than said first predetermined voltage.

16. A motor control device for an electric vehicle according to claim 1, wherein said predetermined voltage value equals said first predetermined voltage.

17. A motor control device for an electric vehicle according to claim 2, wherein said predetermined current value equals said first predetermined current.

18. A motor control device for an electric vehicle according to claim 1, wherein said regenerative braking amount control means repeatedly decreases said amount of regenerative braking energy by a fixed amount until said battery voltage is less than or equal to said first predetermined voltage.

19. A motor control device for an electric vehicle according to claim 2, wherein said regenerative braking amount control means repeatedly decreases said amount of regenerative braking energy by a fixed amount until said charging current is less than or equal to said first predetermined current.

20. A motor control device for an electric vehicle according to claim 18, wherein said predetermined voltage value equals said first predetermined voltage.

21. A motor control device for an electric vehicle according to claim 19, wherein said predetermined current value equals said first predetermined current.

* * * * *